United States Patent [19]

Sampey

[11] 3,846,701

[45] Nov. 5, 1974

[54] VEHICLE PERFORMANCE COMPUTER

[75] Inventor: Harry R. Sampey, Vanderbilt, Pa.

[73] Assignee: Pentron Industries, Inc., Cleveland, Ohio

[22] Filed: May 10, 1971

[21] Appl. No.: 141,657

[52] U.S. Cl.............. 324/175, 324/178, 235/92
[51] Int. Cl. .......................................... G01p 3/36
[58] Field of Search .......... 324/166, 173, 174, 175, 324/178–180, 162; 235/92 A, 92 T, 150.2, 151.32

[56] References Cited
UNITED STATES PATENTS

| | | | |
|---|---|---|---|
| 3,125,884 | 3/1964 | Davies | 324/178 |
| 3,530,382 | 9/1970 | Liston | 324/178 |
| 3,549,868 | 12/1970 | Watson | 324/166 |
| 3,639,753 | 2/1972 | Reich | 324/166 |
| 3,708,750 | 1/1973 | Bucks | 324/162 |
| 3,710,246 | 1/1973 | Herring | 324/162 |
| 3,748,580 | 7/1973 | Stevens | 324/162 |

Primary Examiner—Michael J. Lynch
Attorney, Agent, or Firm—Dominik, Knechtel, Godula & Demeur

[57] ABSTRACT

A vehicle performance computer which is selectively operable to function as either a speedometer, or as a performance speed computer to determine the time required for the motor vehicle to travel a predetermined distance. Unlike many such devices of this latter type, the predetermined distance is internally measured, thus making it unnecessary to first establish a measured distance over which the performance of the vehicle is measured.

2 Claims, 4 Drawing Figures

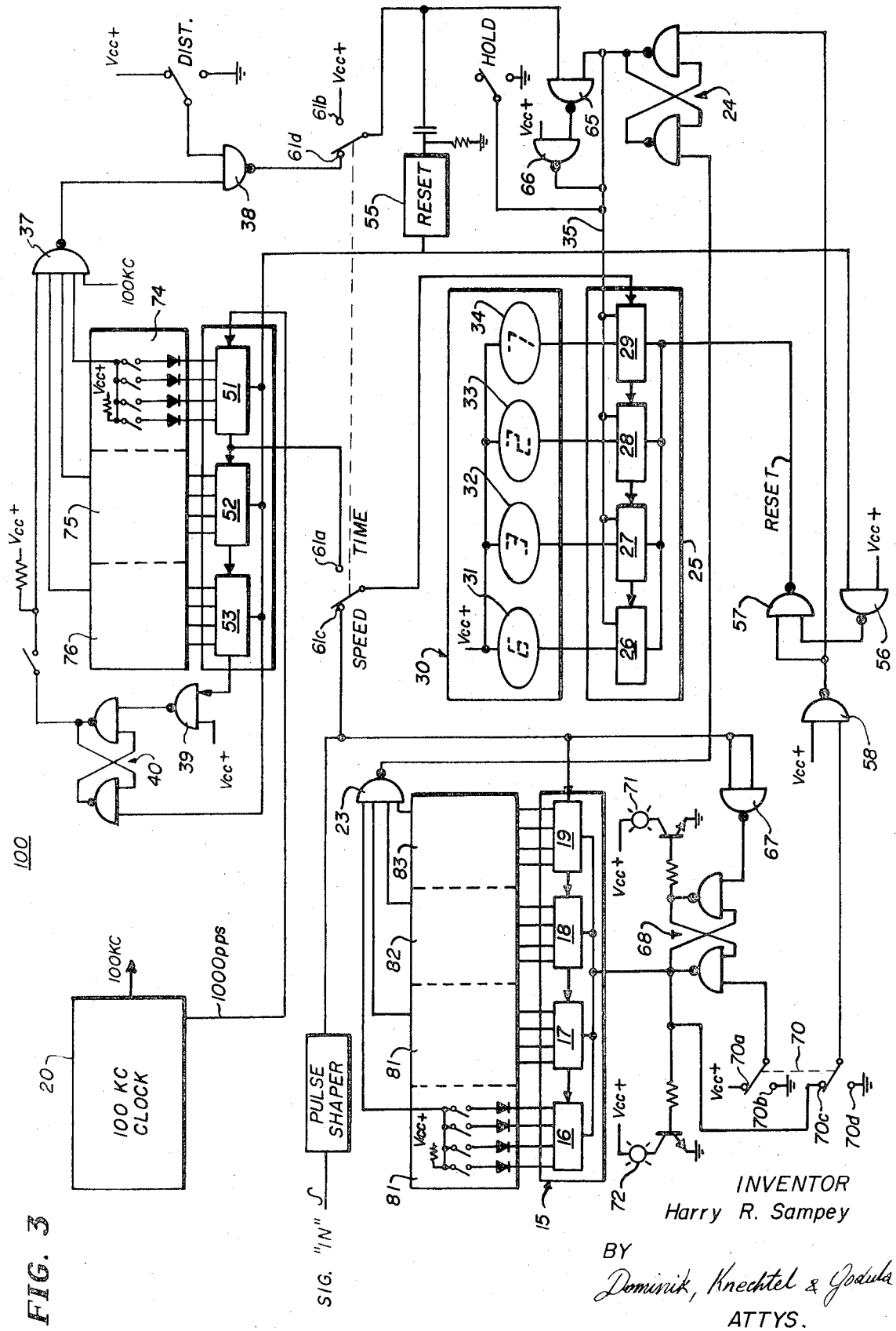

INVENTOR
Harry R. Sampey

BY
Dominik, Knechtel & Godula
ATTYS.

INVENTOR
Harry R. Sampey
BY
Dominik, Knechtel & Godula
ATTYS.

VEHICLE PERFORMANCE COMPUTER

This invention relates to a vehicle performance computer for use in motor vehicles and the like to selectively provide a visual digital display of the speed thereof, or alternatively, the time elapsed in the motor vehicle traveling an internally measured distance.

More specifically, the vehicle performance computer of the present invention is selectively operable to function as either a speedometer, or as a performance speed computer to determine the time required for the motor vehicle to travel a predetermined distance. Unlike many such devices of this latter type, the predetermined distance is internally measured, thus making it unnecessary to first establish a measured distance over which the performance of the vehicle is measured.

The vehicle performance computer utilizes electrical signal pulses which are caused to occur every time the vehicle traverses a predetermined increment of distance. The rate at which these signal pulses occur is, of course, directly proportional to the velocity of the vehicle. Thus, by determining the rate and compensating for the constant of proportionality, the velocity of the vehicle can be obtained. This is accomplished by counting the signal pulses for a predetermined time interval, and by properly adjusting the length of this time interval, the constant of proportionality can be adjusted to be 1.0. The actual count of the signal pulses then is a direct indication of the velocity or speed of the vehicle.

By the same token, knowing the number of signal pulses which are produced in traveling a predetermined distance, this number of signal pulses can be counted and accumulated and then used to control the counting of clock pulses in a second counter, in a fashion such as to indicate the time elapsed in the vehicle traveling the predetermined distance.

The vehicle performance computer can be provided as original equipment on a motor vehicle, or it can be easily and quickly installed on any existing vehicle, with a minimum of effort. It, furthermore, is selectively operable to function in either of the above-described modes of operation, simply by operating one or more manually adjustable switches, and is easily adjusted to compensate for different size diameter tires.

Accordingly, it is an object of the present invention to provide an improved vehicle performance computer for use in motor vehicles to selectively provide a visual display of the speed thereof or, alternatively, the time elapsed in the vehicle traversing an internally measured distance.

Another object is to provide a vehicle performance computer of the above-type which is easily pre-programmed to accommodate different tire sizes and/or predetermined distances.

Still another object is to provide a vehicle performance computer of the above-type which can be easily provided as original equipment on a vehicle and/or easily installed on existing vehicles as a modification thereof or an accessory therefor.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 3 is a block diagram of a vehicle performance computer exemplary of the invention.

Similar reference characters refer to similar parts throughout the several views of the drawings.

Figure 1:
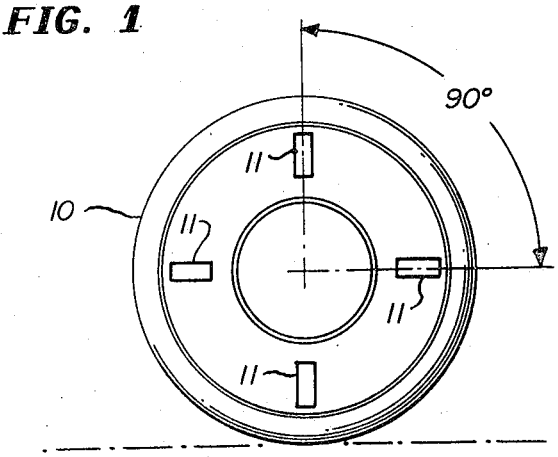
FIG. 1 is a plan view generally representing the manner in which reflective strips are affixed to a vehicle tire.
Figure 2:
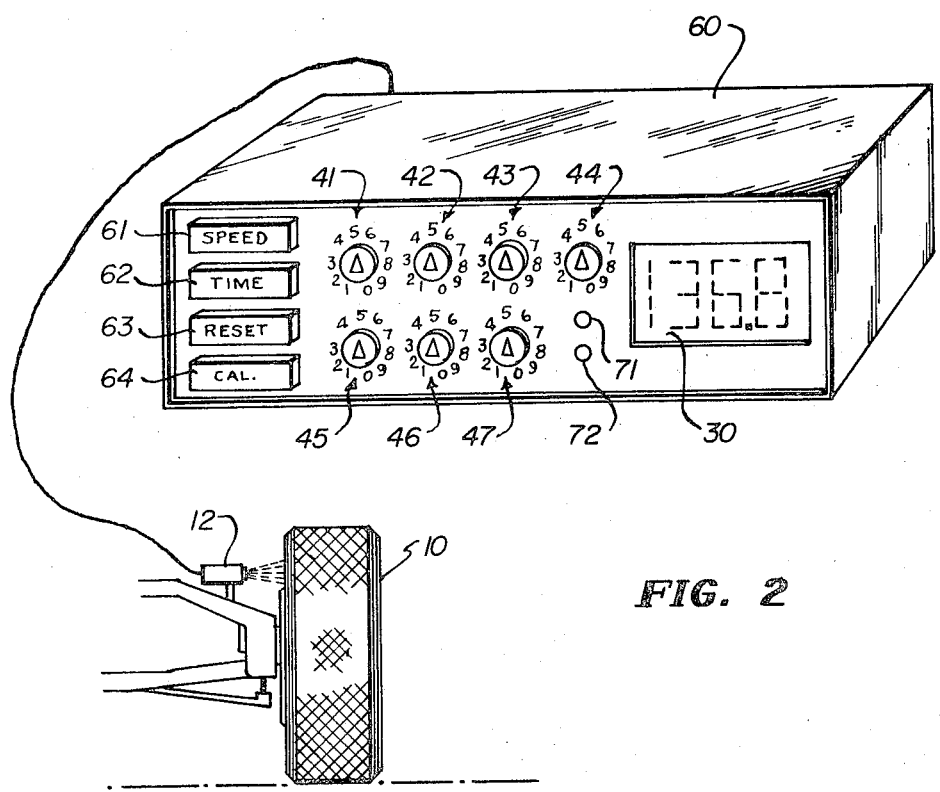
FIG. 2 is a view generally illustrating the manner in which the reflective strips are detected and used to provide electrical input signal pulses to the vehicle performance computer, and further pictorally illustrating a vehicle performance computer exemplary of one manner in which it can be housed in a cabinet.

Referring now to the drawings, a vehicle performance computer 100 exemplary of the invention is graphically illustrated in FIG. 2 and is illustrated in block diagram in FIG. 3. In the illustrated embodiment, the input to the computer 100 is in the form of electrical signal pulses which are provided by affixing reflective strips 11 every 90° about a tire 10 of a vehicle, as shown in FIG. 1. These reflective strips 11 are photoelectrically sensed by means of an optical scanning head 12 which is mounted on the vehicle, as illustrated, for example, in FIG. 2, and provides an electrical signal pulse for every ¼ revolution of tire. The reflective strips 11 are a convenient method of producing the electrical signal pulses, and one which can be easily adapted to existing vehicles. However, it is obvious that other methods using, for example, magnetic sensors and the like could as well be used. Also, when the computer 100 is provided as original equipment on a vehicle, these signal pulses can be provided from a more convenient source. Furthermore, in the latter case, the circuitry of the computer 100 can be simplified.

Since all tire diameters are not the same, it is apparent that the number of signal pulses provided in traveling any distance will vary, when reflective strips 11 are used to provide the signal pulses. Most tire diameters vary from the smallest of 23 inches to a maximum of 30 inches. With the reflective strips 11, each 90° rotation of the tire 10 will present a signal pulse, and the number of signal pulses provided in traveling any distance then can be determined from the following equation:

$$P = ky/(c/a)$$

where:
$P$ = number of signal pulses
$k$ = distance in feet
$y$ = inches in feet
$c$ = circumference of tire
$a$ = number of reflective strips 11 in 360° rotation.

Accordingly, if the tire 10 is 24 inches in diameter and the measured distance is ¼ of a mile, then:

$$P = [(5280/4)(12)/(24 \times 3.14/4)] = 15,840/18.84$$

$$P = 840.76$$

A 30 inch diameter tire, over the same distance, will provide 672.61 signal pulses.

As indicated above, knowing the number of signal pulses which are produced in traveling in predetermined distance, the time required for a vehicle to travel that distance can be determined. With the computer 100, this is accomplished as follows. A 100 KC pulse generator or clock 20 provides 100 clock pulses per second (PPS) to a clock pulse counter/decoder 25 which includes a series of integrated counter-latch-decoders 26–29 (hereinafter referred to as decoders 26–29) which may be a monolithic MSI integrated circuit combining the functions of an NBCD counter, four-bit latch, and a seven-segment decoder/driver of the type sold under the designation MC4050L by Motorola. These decoders 26–29 accumulate these clock pulses, and drive the four 7-segment numetric indicators 31–34 forming the digital indicator 30.

In the illustrated embodiment, the 100 PPS clock pulses are derived from the output of a binary decade counter 51 of a clock pulse counter 50, the latter being driven by 1,000 PPS clock pulses from the clock 20. This arrangement permits simplification of the circuitry of the clock 20 and the clock pulse counter 50, however, the clock 20 could be of a construction such as to directly provide the 100 PPS clock pulses for driving the counter/decoder 25.

While these clock pulses are being counted, accumulated and used to drive the digital indicator 30, the signal pulses produced by the reflective strips 11 are being coupled to the computer 100, shaped by a pulse shaper 14, and coupled to a signal pulse counter 15. The latter includes a series of binary decade counters 16–19 which count and accumulate these signal pulses.

These counters 16–19 are adapted to be pre-programmed so that when the accumulated count content corresponds to the number of signal pulses which will be produced in the vehicle traveling a pre-determined distance, further up-dating of the accumulated count of clock pulses it terminated. Then, at that time, the display digits on the digital indicator 30 represents the time elapsed in the vehicle traveling that pre-determined distance. Pre-programming of the counters 16–19 of the signal pulse counter 15 is accomplished by means of binary coded decimal (BCD) switches 80–83 connected with them. The BCD switches 80–83 are manually set by means of switches 41–44 on the front panel of the cabinet 60 housing the computer 100, to gate an output signal when the count in the respective counters corresponds to the dialed or set digit. In pre-programming the counters 16–19, the BCD switches 80–83 are pre-set for the nearest whole number of signal pulses to be received, for example, 841 in the case of a 24 inch diameter tire, if the measured distance is ¼ of a mile. In this case, the digit 8, the digit 4 and the digit 1 would be set on the switches 42–44, respectively.

When the accumulated count of the signal pulses in the counters 16–19 correspond to the number of signal pulses to be received in traveling a pre-established distance, the logic output of the multiple input NAND gate 23 triggers the flip-flop 24 to in turn, provide an output signal to the storage strobe line 35 of the counter/decoder 25. This signal pulse on the strobe line 35 prevents any further updating of the data display by the digital indicator 30. The digits indicated on the digital indicator 30 at this time, therefore, will indicate the time in seconds required for the vehicle to travel the pre-established distance.

It is, of course, apparent that some means must be provided for activating the clock 20 and/or the digital indicator 30 and the signal pulse counter 15 at the same time. In this case, the pushbutton switch 62 marked TIME located on the front panel (FIG. 2) of the cabinet 60 is operated to close the contacts 61a and 61b (FIG. 3) to establish the mode of operation of the computer 100. At contact 61a, the clock 20 is coupled to the counter/decoder 25 and, at contact 61b, a signal voltage is coupled to the one shot multivibrator 55 to trigger it, thereby coupling an input to the NAND gate 56. This input to NAND gate 56 enables it, providing a logic output to NAND gate 57, the logic input to the latter at this time being such that its logic output coupled to the counter/decoder 25 causes all of the decoders 26–29 to reset.

The signal voltage, at contact 61b, also operates on the NAND gates 65 and 66 such that the logic output of the gate 66 coupled to the strobe line 35 prevents counting of the clock pulses. When the first signal pulse is received, NAND gate 67 is enabled and its logic output is coupled to and operates the flip-flop 68. The output of the latter is coupled through contact 70c of a RESET switch 70 to the NAND gate 58, the logic output of this gate and the NAND gate 57 now being such as to enable the counter/decoder 25 to count the clock pulses coupled to it. Also, the logic output of the gate 58 triggers the flip-flop 24 to enable the strobe line 35, thus permitting the date to be up-dated.

If desired, a RED light 71 and a GREEN light 72 can be coupled with the flip-flop 68 such that the RED light 71 is lit to give an indication of the non-counting condition of the computer 100. When the computer 100 is activated, and the flip-flop 68 enables the counter/decoder 25, the GREEN light 72 is energized and the RED light extinguished.

As indicated above, when the accumulated count of signal pulses corresponds to the pre-programmed count, the logic output of the NAND gate 23 triggers the flip-flop 24 to prevent further up-dating of the data displayed by the digital indicator 30. To enable the system to again time an event, the RESET switch 70 (FIGS. 2 and 3) is operated to close contacts 70b and 70d, the result of which is to reset the decoders 26–29 and the flip-flop 68 to prepare the computer 100 for the next cycle of operation.

To operate the vehicle performance computer 100 as a speedometer, the pushbotton switch 61 marked SPEED (FIG. 2) is operated, to thereby close contacts 61c and 61d (FIG. 3). In this position, 1,000 PPS clock pulses are coupled to the clock pulse counter 50, including the binary decade counters 51–53, and the signal pulses are coupled to the counter/decoder 25.

As indicated above, the rate at which the signal pulses occur is directly proportional to the speed or velocity of the vehicle, thus by determining the rate at which these signal pulses occur and by compensating for the constant of proportionality, the velocity of the vehicle can be obtained. For example, assume that a vehicle has a two foot diameter tire. Using reflective strips 11, it can be calculated that the distance that the vehicle will travel between signal pulses is 1.57 feet. If the vehicle is traveling at 120 MPH, or 176 feet/second, 112.10 signal pulses will occur in 1 second. These signal pulses are coupled to the counter/decoder 25, and the latter drives the digital indicator 30. Since the latter displays only whole numbers, the number of signal pulses actually counted and displayed are 112. This, of course, is 8 MPH less than the actual speed of the vehicle.

With the vehicle performance computer 100, the constant of proportionality is provided for by counting the signal pulses for a predetermined time interval, and by adjusting the length of the time interval so that the constant of proportionality is always 1.0 MPH. To represent this constant of 1.0 MPH, the clock pulse counter 50 is used. Its series of binary decade counters 51-53 have binary coded decimal (BCD) switches 74-76 coupled with them, which can be used to preprogram these counters 51-53 to provide a function when the programmed number is reached. This programmed number is, of course, the constant of proportionality for 1.0 MPH, and the BCD switches 74-76 permit it to be adjusted to compensate for different size tire diameters.

The constant of proportionality for any different size tire diameter can be determined from the following equation:

$$k = t/1b$$

where:
$k$ = mathematical constant
$b$ = feet in 1 mile
$t$ = seconds in 1 hour
or:

$$k = 3600/(1)(5280)$$

therefore:

$$k = 0.6818$$

To find the time constant number for a 2 foot diameter tire, it is only necessary to multiply the distance between signal pulses times the 1 MPH equation:

$$c = (t/1b) \, d$$

where:
$c$ = constant of proportionality
$t$ = seconds in 1 hour
$b$ = feet in 1 mile
$d$ = feet between signal pulses
or:

$$c = [3600/(1)(5280)] \, (1.57) = 0.6818 \times 1.57$$

therefore:

$$c = 1.07042$$

This constant number, therefore, is pre-programmed into the binary decade counters 51-53, by setting the BCD switches 74-76. Ten position switches 45-47 are provided on the front panel of the cabinet 60, for setting these BCD switches 74-76.

The clock 20 can be adapted to provide 100,000 clock pulses per second to a series of six binary counters like the counters 51-53, and these six counters can be provided with BCD switches so that the constant of 1.07042 can be pre-programmed. In such a case, 107,042 clock pulses would be counted. However, in the illustrated embodiment, the clock 20 is adapted to provide 1,000 clock pulses per second to the clock pulse counter 50 including only the three counters 51-53, and these counters are adapted to count 1,070 clock pulses, as follows. In pre-programming these counters 51-53, the BCD switches 74-76 are programmed with only the first three digits after the decimal, that is, the digits 070, on the switches 76, 75 and 74, respectively. The counters are prevented from providing a function when the accumulated count totals 70, by a multiple input NAND gate 37 and the NAND gate 38. When the counters 51-53 have counted 1,000 clock pulses, an input is coupled to the NAND gate 39 and its logic output is coupled to and causes a flip-flop 40 to provide a logic input to the NAND gate 37. The counters 51-53 also all reset to zero and continue counting clock pulses.

When the accumulated count now reaches 70, the BCD switches 74-76 provide a logic input to the NAND gate 37, the latter is enabled, and a logic input is coupled to the NAND gate 38. The latter is also enabled and provides a logic output through contact 61d to trigger the 1-shot multivibrator 55 which, in turn, couples a reset pulse to the counters 51-53 to reset them and to the flip-flop 40 to reset it. This reset pulse also resets the decoders 26-29, through the gates 56 and 57, to ready them to again count the signal pulses coupled to them. The logic output of the NAND gate 38 also operates on lthe gates 65 and 66 to trigger the strobe line 35 to prevent further updating of the displayed count.

From the above, it can be seen that the clock pulse counter 50 has been caused to count 1,070 clock pulses so that it effectively is held open and prevented from closing the gating of signal pulses to the counter/decoder 25 for 7/100 of a second after the latter has counted 112 signal pulses. In this 7/100 of a second, 8 additional signal pulses will have been coupled to the counter/decoder 25, since these signal pulses occur every 0.00892 seconds. Accordingly, the display count will be 120 which, of course, is the actual speed of the vehicle.

Figure 4:
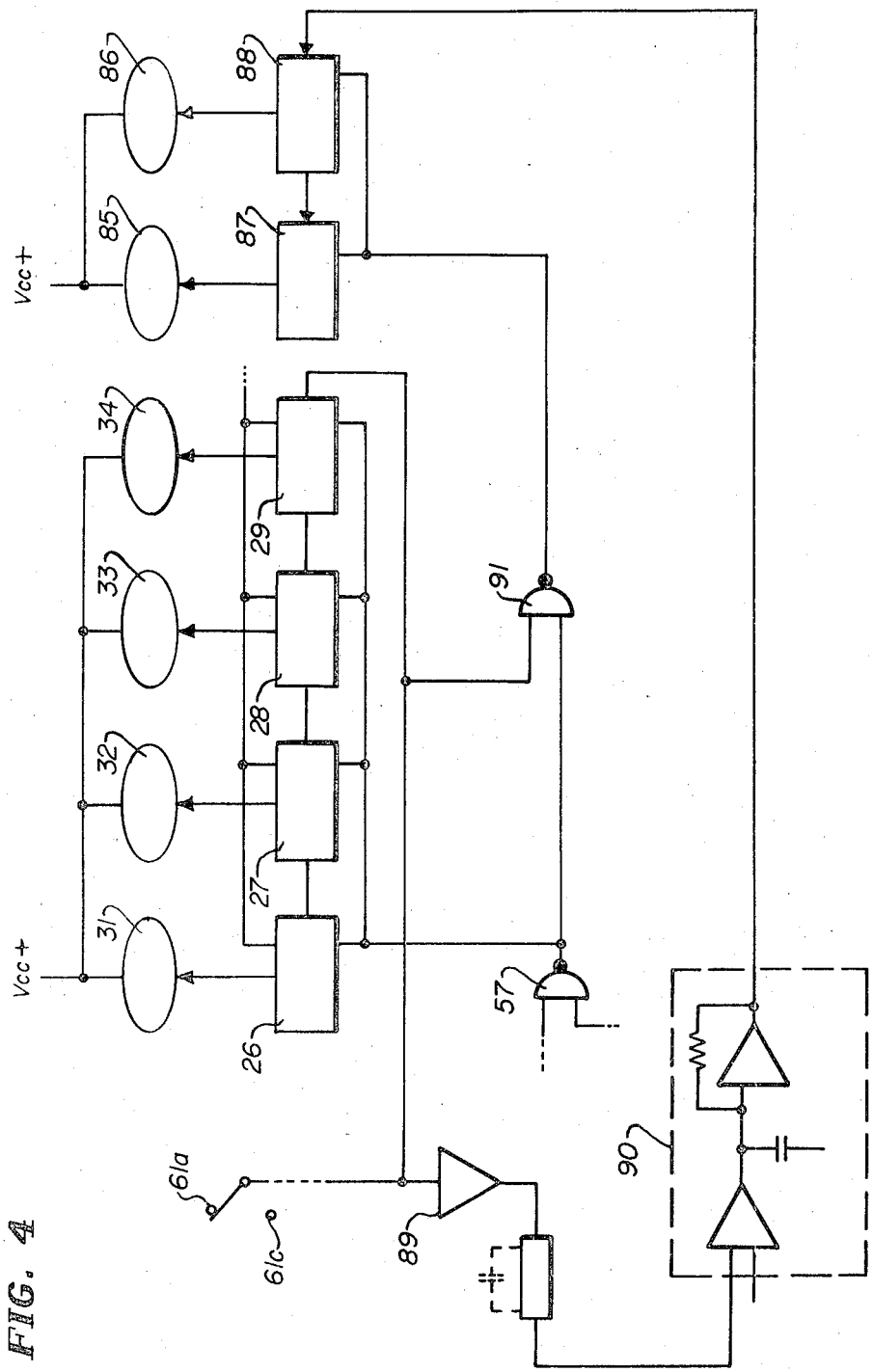
FIG. 4 is an alternative circuit arrangement to display the 100th of the speed of the vehicle.

In FIG. 4, there is illustrated an arrangement whereby the hundredth of the vehicles speed can be displayed to thereby provide accuracy of $\pm 0.01$ MPH. As can be seen, two additional numetric indicators 85 and 86, with decoders 87 and 88 like the decoders 26-29 for driving them, are provided. These indicators 85 and 86 and their associated decoders 87 and 88 are in no way connected with the whole number indicators of the speed, and all numbers displayed to the left of the decimal are derived in the manner described above. The numbers displayed to the right of the decimal are derived in the manner set forth below.

Any time period between the signal pulses represent a percentage of that time, from or to, the next whole number. Then, any percentage of time from the last pulse must then be the percentage from the whole number of 1.0 MPH. In order to present the hundredths of the speed, it is therefore necessary to develop 100 pulses between each signal pulse and these pulses must always be in direct proportion. Since the signal pulse rate of time is linear, the solution can be provided as follows.

The signal pulses coupled to the decoders 26-29 also are coupled to an average summing amplifier 89 whose D.C. output voltage is directed to a voltage controlled oscillator (VCO) 90. Thus, the analog output from the summing amplifier 89 is proportional to the product of the digital variable. The VCD 90 can be of a conventional design, to provide 100 pulses per second, hence it is not described in detail. Long term accuracy of the VCO 90 is not important since the percentage displays are reset each 1.0 MPH, thus tolerances of the VCO can never accumulate in the hundredths display.

As an example, assume that a vehicle is traveling 82.33 MPH, in which case, the time between signal pulses is 0.0130 seconds. The signal pulses are coupled to the decoders 26–29 driving the indicators 31–34. To the left of the decimal, the number "82" will be displayed. These signal pulses also are coupled to the summing amplifier 89 and the VCO 90 which is triggered to produce 100 pulses per second, between each signal pulse. These 100 pulses per second are coupled to the decoders 87 and 88 driving the indicators 85 and 86.

Before the least significant digit "2" changes to "3," the pre-programmed counters 51–53 of the clock pulse counter 50 containing the constant for 1 MPH, direct the incoming data gates to close, the gate 57 coupling a reset pulse to the decoders 26–29, in the manner described above. This reset pulse likewise is coupled through the gate 91 to the decoders 87 and 88. These decoders 87 and 88, at this time, will have driven the indicators 85 and 86 to indicate the number of pulses they have counted which will represent 33 percent of one whole number. Accordingly, the total displayed number will read 82.33 MPH.

It can be seen from the above description that the vehicle performance computer 100 is extremely versatile, the same being selectively operable to function as a speedometer or to measure the elapsed time in a vehicle traveling a predetermined distance. It furthermore can be provided as original equipment on a vehicle, or easily installed on an existing vehicle. The TIME and SPEED information is visually digitally displayed, and the computer can be easily and quickly adjusted to compensate for different size diameter tires and to internally measure different pre-determined distances.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

I claim:

1. A vehicle performance computer comprising, in combination: a digital indicator; driver means coupled to and driving said digital indicator to indicate time in seconds thereon in accordance with the number of clock pulses received and counted thereby; pulse generator means coupled to said driver means for providing clock pulses thereto; gating means associated with said digital indicator and said driver means operable to prevent further updating of the information displayed by said digital indicator; signal pulse generator means for producing an electrical signal pulse each time the vehicle travels a pre-established increment of distance; signal pulse counter means for receiving and counting said electrical signal pulses; said signal pulse counter means being programmed to count a pre-determined number of said electrical signal pulses corresponding to the number of said electrical signal pulses occurring in the vehicle traveling a pre-determined distance and triggering said gating means to prevent further updating of the information displayed by said digital indicator, whereby the time indicated in seconds on said digital indicator represents the time elapsed in the vehicle traveling said internally measured pre-determined distance; switch means for coupling said electrical signal pulses to said driver means and for disconnecting said clock pulses therefrom, whereby the information displayed by said digital indicator is directly proportional to the velocity of the vehicle; a clock pulse counter for counting a pre-determined number of clock pulses, said number of clock pulses counted corresponding to a time interval to establish a constant of proportionality of 1.0 MPH; gating means enabled by said clock pulse generating when said pre-determined number of clock pulses have been counted to gate said first-mentioned gating means to prevent further up-dating of the information displayed by said digital indicator, whereby said displayed information corresponds to the velocity of said vehicle; said digital indicator including a first portion thereof which is driven by said signal pulses coupled to said driver means to indicate the velocity of said vehicle in whole numbers and a second portion which is driven to indicate the hundredths of said velocity of said vehicle, said second portion being operated by second driver means independent of said driver means for said first portion; and means triggered by said signal pulses and producing 100 pulses per second during the time interval between each of said signal pulses, said 100 pulses per second being coupled to and driving said second driver means, whereby the information displayed by said second portion of said digital indicator indicates the hundredths velocity of said vehicle.

2. A vehicle performance computer comprising in combination: signal pulse generator means for producing an electrical signal pulse each time the vehicle travels a preestablished increment of distance; a digital indicator; driver means coupled to and driving said digital indicator in accordance with the number of signal pulses received and counted thereby, whereby the information displayed by said digital indicator is directly proportional to the velocity of the vehicle; gating means associated with said digital indicator and said driver means operable to prevent further updating of the information displayed by said digital indicator; pulse generator means for producing clock pulses; a clock pulse counter programmable to count a pre-determined number of clock pulses corresponding to a time interval to establish a constant of proportionality of 1.0 MPH; gating means enabled by said clock pulse counter when said programmed number of clock pulses have been counted to gate said first-mentioned gating means to prevent further updating of the information displayed by said digital indicator, whereby said information corresponds to the actual velocity of said vehicle; said digital indicator including a first portion thereof which is driven by said signal pulses coupled to said driver means to indicate the velocity of said vehicle in whole numbers and a second portion which is driven to indicate the hundredths of said velocity of said vehicle, said second portion being operated by second driver means independent of said driver means for said first portion, and means triggered by said signal pulses and producing 100 pulses per second during the time interval between each of said signal pulses, said 100 pulses per second being coupled to and driving said second driver means, whereby the information displayed by said second portion of said digital indicator indicates the hundredths velocity of said vehicle.

* * * * *